(12) United States Patent
Jung et al.

(10) Patent No.: US 8,514,306 B2
(45) Date of Patent: Aug. 20, 2013

(54) CORRELATED DOUBLE SAMPLING CIRCUIT, IMAGE SENSOR INCLUDING THE SAME, AND IMAGE PROCESSING SYSTEM INCLUDING THE IMAGE SENSOR

(75) Inventors: Wun-Ki Jung, Suwon-si (KR); Seog Heon Ham, Suwon-si (KR); Dong Hun Lee, Yongin-si (KR); Kwi Sung Yoo, Seoul (KR); Min Ho Kwon, Seoul (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 335 days.

(21) Appl. No.: 12/801,999

(22) Filed: Jul. 7, 2010

(65) Prior Publication Data

US 2011/0069191 A1    Mar. 24, 2011

(30) Foreign Application Priority Data

Sep. 18, 2009  (KR) .......................... 10-2009-0088755

(51) Int. Cl.
  *H04N 5/20*    (2006.01)
(52) U.S. Cl.
  USPC ........................................................ 348/255
(58) Field of Classification Search
  USPC ................. 348/222.1, 229.1, 241, 254, 255, 348/302, 362, 364, 365, 366
  See application file for complete search history.

(56) References Cited

U.S. PATENT DOCUMENTS

| 6,232,902 | B1 * | 5/2001 | Wada | 341/143 |
| 6,433,632 | B1 * | 8/2002 | Nakamura et al. | 330/9 |
| 6,727,486 | B2 | 4/2004 | Choi | |
| 6,797,932 | B2 * | 9/2004 | Takahashi et al. | 250/208.1 |
| 6,864,919 | B2 * | 3/2005 | Hua | 348/241 |
| 6,982,758 | B2 * | 1/2006 | Rossi | 348/300 |
| 7,268,338 | B2 * | 9/2007 | Liu et al. | 250/214 AG |
| 2002/0134918 | A1 * | 9/2002 | Miida | 250/214.1 |
| 2005/0088554 | A1 * | 4/2005 | Scott-Thomas et al. | 348/294 |
| 2008/0116966 | A1 * | 5/2008 | Chae et al. | 327/554 |
| 2009/0108929 | A1 * | 4/2009 | Yan | 330/9 |
| 2011/0194007 | A1 * | 8/2011 | Kim et al. | 348/308 |

FOREIGN PATENT DOCUMENTS

| JP | 2002-218324 | 8/2002 |
| JP | 2006-303601 | 11/2006 |
| JP | 2008-300941 | 12/2008 |
| KR | 10-0399954 | 9/2003 |

* cited by examiner

*Primary Examiner* — Aung S Moe
*Assistant Examiner* — Chriss Yoder, III
(74) *Attorney, Agent, or Firm* — Harness, Dickey & Pierce, P.L.C.

(57) ABSTRACT

A correlated double sampling (CDS) circuit is provided. The CDS circuit is configured to perform a CDS on a reset signal and an image signal during a CDS phase respectively. The CDS circuit includes a sampling circuit configured to output a difference between a correlated double sampled reset signal and a correlated double sampled image signal, and a feedback unit configured to feedback the difference output from the sampling circuit during a PGA phase to an input of the sampling circuit.

10 Claims, 6 Drawing Sheets

CORRELATED DOUBLE SAMPLING CIRCUIT, IMAGE SENSOR INCLUDING THE SAME, AND IMAGE PROCESSING SYSTEM INCLUDING THE IMAGE SENSOR

CROSS-REFERENCE TO RELATED APPLICATIONS

This application claims priority under 35 U.S.C. §119 to Korean Patent Application No. 10-2009-0088755, filed on Sep. 18, 2009, in the Korean Intellectual Property Office (KIPO), the entire contents of which are incorporated herein by reference.

BACKGROUND

Embodiments of the present inventive concept relate to a correlated double sampling technology, and more particularly, to a correlated double sampling circuit amplifying and outputting a correlated double sampled signal, an image sensor including the same, and an image processing system including the image sensor.

In a CMOS image sensor (CIS), an operation of correlated double sampling (CDS) is needed. In addition, an image capture (or pickup) sensitivity adjustment function has become almost essential in the CIS.

In a conventional CIS, an image capture sensitivity of the CIS is adjusted, before performing analog to digital conversion on a result of a CDS operation, by adding a constant gain to a result of the CDS operation. In the conventional CIS, a programmable gain amplifier (PGA) circuit is embodied between a CDS circuit and an analog to digital converter (ADC). A conventional PGA circuit is a circuit including a plurality of capacitors having various capacitances and a result of CDS output from a CDS circuit is amplified by using each capacitance ratio of the plurality of capacitors. However, as the conventional PGA circuit is composed by using a plurality of capacitors, there may be occurred mismatch between capacitors. Additionally, in a general CIS, since ADC is connected to every column in a two dimensional pixel arrangement, adding a conventional PGA circuit to each column of the CIS increases a total area of the CIS.

SUMMARY

The present general inventive concepts provide a correlated double sampling circuit, which may perform both a CDS operation and a PGA operation, an image sensor including the correlated double sampling circuit, and an image processing system including the image sensor.

An example embodiment of the present invention is directed to a correlated double sampling (CDS) circuit, including a sampling circuit configured to perform a CDS on a reset signal and an image signal respectively during a CDS phase and to output a difference between a correlated double sampled reset signal and a correlated double sampled image signal, and a feedback unit configured to feed back the difference output from the sampling circuit to an input of the sampling circuit during a PGA phase. The sampling circuit is configured to accumulate or amplify and output the difference fed back during the PGA phase by N times.

An example embodiment of the present invention is directed to an image sensor, including a pixel array including a plurality of pixels each is configured to convert an optical signal into an electrical signal, a correlated double sampling (CDS) circuit configured to perform correlated double sampling on a reset signal and an image signal output from the pixel array, respectively, and to output a correlated double sampled analog signal, and an analog to digital converter configured to perform an analog to digital conversion on the correlated double sampled analog signal output from the correlated double sampling circuit.

An example embodiment of the present invention is directed to an image processing system, including the image sensor and a processor configured to process a signal output from the image sensor.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION OF THE PREFERRED EMBODIMENTS

Figure 1:
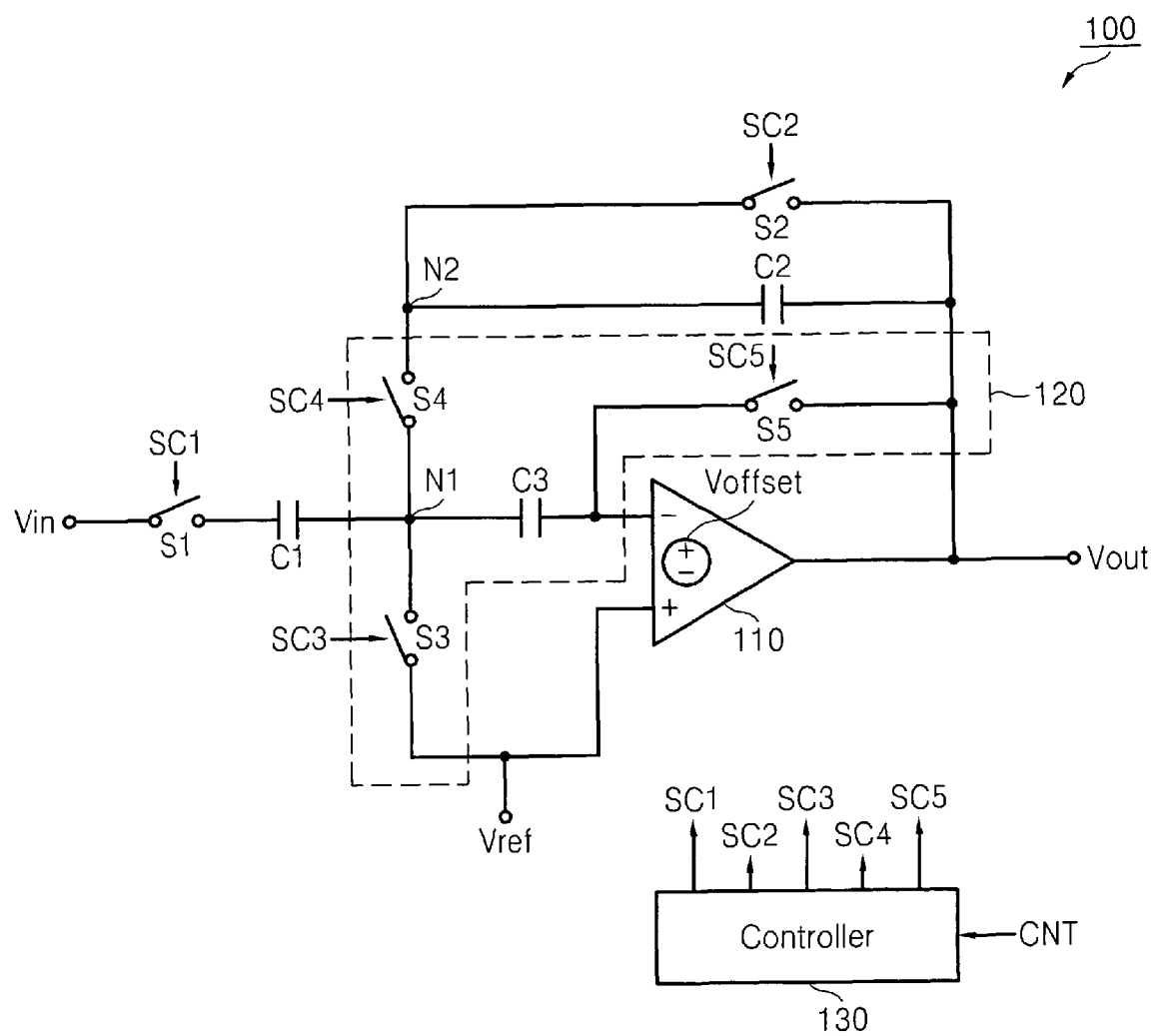
FIG. 1 is a schematic block diagram of a correlated double sampling circuit according to an example embodiment of the present invention.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

FIG. 1 is a schematic block diagram of a correlated double sampling circuit according to an example embodiment of the present invention. Referring to FIG. 1, the correlated double sampling circuit (CDS) 100 may include a sampling circuit and an offset calibration circuit 120. For convenience of explanation, the CDS circuit 100 and a switch controller 130 are illustrated together in FIG. 1. According to embodiments, the switch controller 130 may be embodied inside of a timing controller 230 illustrated in FIG. 5.

The sampling circuit may sample each of two signals, e.g., a reset signal and an image signal, output from a pixel array (not shown) and output difference between the two sampled signals during a CDS phase.

The sampling circuit may sample a reset signal (Vrst of FIG. 3) output from the pixel array during a first time of the CDS phase, e.g., during a reset phase. The sampling circuit may sample an image signal (Vsig of FIG. 3) output from the pixel array during a second time of the CDS phase, e.g., during a signal phase. The sampling circuit may integrate and output difference ($\Delta V = Vrst - Vsig$) between a sampled reset signal and a sampled image signal.

The sampling circuit may include an amplifier 110, a first capacitor C1, a second capacitor C2 and a plurality of switches S1 and S2. The first switch S1 may transmit a signal Vin output from the pixel array, e.g., a reset signal and an image signal, to a first capacitor The first capacitor C1 may be connected between an output terminal of the first switch S1 and a first node N1. The second capacitor C2 may be connected between a second node N2 and an output terminal of the amplifier 110. The second switch S2 may be connected to both terminals of the second capacitor C2. The reference voltage Vref may be input to a second input terminal, e.g., a positive input terminal (+), of the amplifier 110. The reference voltage Vref may be a DC voltage or a ground voltage GND.

An offset voltage Voffset may occur in the amplifier 110. FIG. 1 illustrates that the offset voltage Voffset occurs inside of the amplifier 110.

The offset correction circuit 120 may perform an offset voltage correction operation canceling an offset voltage Voffset occurred from the amplifier 110. For example, the offset correction circuit 120 may charge an offset voltage Voffset of the amplifier 110 during a first time of the CDS circuit 100 and output difference between two signals output from the amplifier 110 during a second time, e.g., an output signal $\Delta V$ where an offset voltage Voffset charged by the difference between a sampled reset signal and a sampled image signal is corrected.

The offset correction circuit 120 may include a third capacitor C3, which is a charging element where a charge corresponding to an offset voltage Voffset may be charged, and a plurality of switches S3 to S5.

The third capacitor C3, the charging element, may be connected between a first node N1 and a first input terminal, e.g., a negative input terminal (−), of the amplifier 110. The third capacitor C3 may charge a charge corresponding to an offset voltage Voffset of the amplifier 110 according to a switching operation of a third switch S3 to a fifth switch S5. The third switch S3 may transmit a reference voltage Vref to the first node N1 in response to a third switching signal SC3. The fourth switch S4 may be connected between the first node N1 and a second node N2, and a fifth switch S5 may be connected between the first input terminal (−) of the amplifier 110 and an output terminal of the amplifier 110.

The switch controller 130 may output each of a plurality of switching signals SC1, SC2, SC3, SC4 and SC5 based on at least a control signal CNT input from outside. Each switch S1 to S5 may be switched in response to each switching signal SC1 to SC5. According to embodiments, each switch S1 to S5 may be embodied as a MOSFET or a transmission gate.

Figure 2:
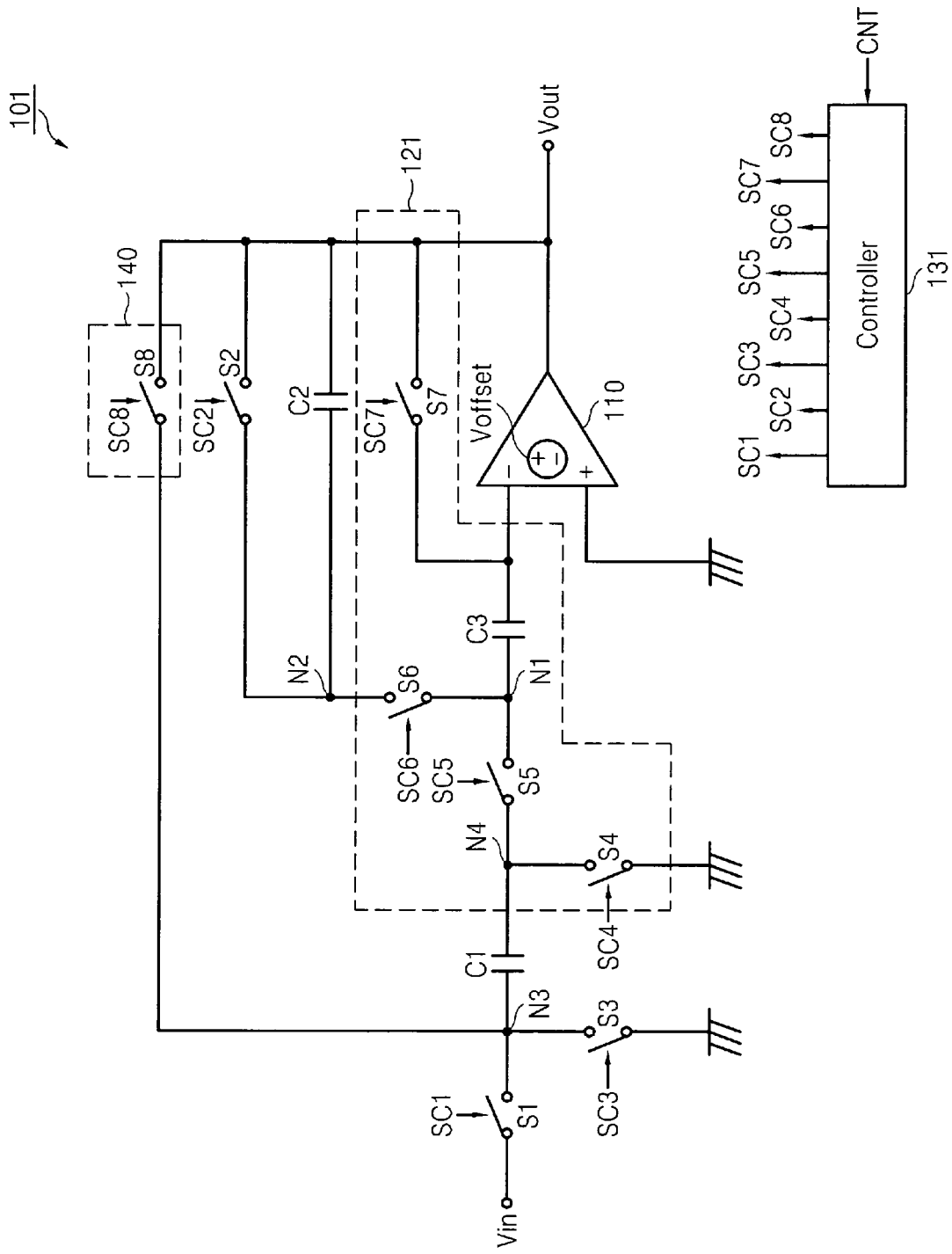
FIG. 2 is a schematic block diagram of a correlated double sampling circuit according to another example embodiment of the present invention.

FIG. 2 is a schematic block diagram of a correlated double sampling circuit according to another example embodiment of the present invention. For convenience of explanation, FIG. 2 illustrates a numeral number having the same function as the numeral number illustrated in FIG. 1 with the same mark, so detailed explanation thereof is omitted.

Referring to FIG. 2, a CDS circuit 101 includes a sampling circuit, an offset correction circuit 121 and a feedback unit 140. For convenience of explanation, FIG. 2 illustrates the CDS circuit 101 and the switch controller 131 together. According to embodiments, the switch controller 131 may be embodied inside of a timing controller 230 illustrated in FIG. 5.

The sampling circuit may sample a reset signal (Vrst of FIG. 3) output from a pixel array during a first time and sample a pixel signal or an image signal (Vsig of FIG. 3) output from the pixel array during a second time. The sampling circuit may integrate and output difference ($\Delta V = Vrst - Vsig$) between a sampled reset signal and a sampled pixel signal.

The sampling circuit may include an amplifier 110, a first capacitor C1, a second capacitor C2, and a plurality of switches S1 to S3. The first switch S1 may transmit a signal Vin output from the pixel array to a third node N3. The first capacitor C1 may be connected between the third node N3 and a fourth node N4. The second capacitor C2 may be connected between a second node N2 and an output terminal of the amplifier 110. The second switch S2 may be connected to both terminals of the second capacitor C2 and a third switch S3 may be connected between the third node N3 and a ground GND.

The second input terminal, e.g., a positive input terminal (+), of the amplifier 110 may be connected to the ground GND. According to embodiments, a predetermined reference voltage may be supplied to the second input terminal of the amplifier 110. A predetermined offset voltage Voffset may occur in the amplifier 110 by its operational property or characteristics.

The offset correction circuit 121 may include the third capacitor C3 charging a charge corresponding to an offset voltage Voffset of the amplifier 110 and a plurality of switches S4 to S7.

The third capacitor C3 may be connected to a first node N1 and a first input terminal, e.g., a negative input terminal (−) of the amplifier 110. The third capacitor C3 may charge a charge corresponding to an offset voltage Voffset according to a switching operation of each of a plurality of switches S4 to S7. The fourth switch S4 may be connected between a fourth node N4 and a ground GND, a fifth switch S5 may be connected between the fourth node N4 and the first node N1, a sixth switch S6 may be connected between the first node N1 and the second node N2, and a seventh switch S7 may be connected between a first input terminal, e.g., a negative input terminal (−), of the amplifier 110 and an output terminal of the amplifier 110.

The feedback unit 140 may feedback difference (ΔV) of an output signal, e.g., a sampled reset signal and a sampled pixel signal, output from the amplifier 110 to the third node N3. Accordingly, the amplifier 110 may amplify the output signal (ΔV), fed back to the third node N3 during a third time, e.g., a programmable gain amplifier (PGA) phase, by N times, where N is a natural number, and output it. The feedback unit 140 may be embodied as a switch, e.g., an eighth switch S8, connected between an output terminal of the amplifier 110 and the third node N3. The output signal (ΔV) fed back to the third node N3 by the eighth switch S8 may be amplified by N times (N is a natural number) according to a switching operation of each switch S1 to S7.

On the other hand, the CDS circuit 101 may adjust a capacitance ratio of the first capacitor C1 to the second capacitor C2 to amplify an output signal (ΔV). For this, one of the first capacitor C1 and the second capacitor C2 may be embodied as a variable capacitor. According to embodiments, the CDS circuit 101 may adjust capacitance of the first capacitor C1 and capacitance of the second capacitor C2 to be equal to each other during a CDS phase, and adjust the capacitance of the first capacitor C1 and the capacitance of the second capacitor C2 with a ratio of M:1, where M is a natural number, or 1:1/M during a PGA phase.

Accordingly, the CDS circuit 101 may output a signal (M*ΔV) amplified by M times from an initial output signal (ΔV) during the PGA phase. Moreover, according to another example embodiment, the CDS circuit 101 may adjust the capacitance of the first capacitor C1 and the capacitance of the second capacitor C2 with a ratio of M (M is a natural number):1 during the CDS phase, and re-adjust the capacitance of the first capacitor C1 and the capacitance of the second capacitor C2 with a ratio of M' (M' is a natural number):1 during the PGA phase. Accordingly, the CDS circuit 101 may output an output signal (M*ΔV) amplified by M times during the CDS phase and output a signal (M'*M*ΔV) amplified again by M' times from an output signal (M*ΔV) amplified by M times during a PGA phase.

The switch controller 131 may output each switching signal SC1 to SC8 for controlling a switching operation of each switch S1 to S8 based on at least one control signal CNT input from outside.

Figure 3:
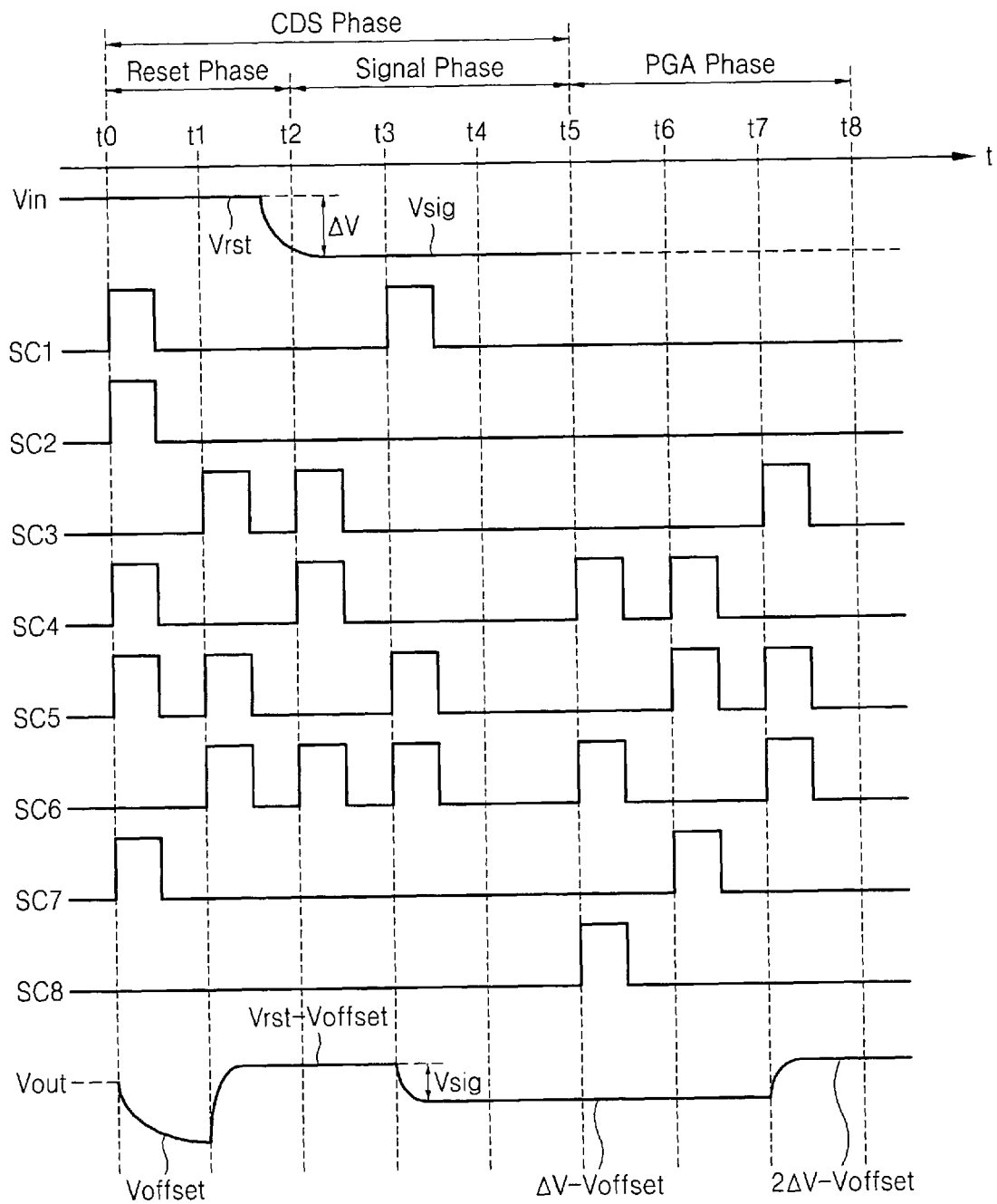
FIG. 3 is a waveform diagram for explaining an operation of the correlated double sampling circuit illustrated in FIG. 2.
Figure 4:
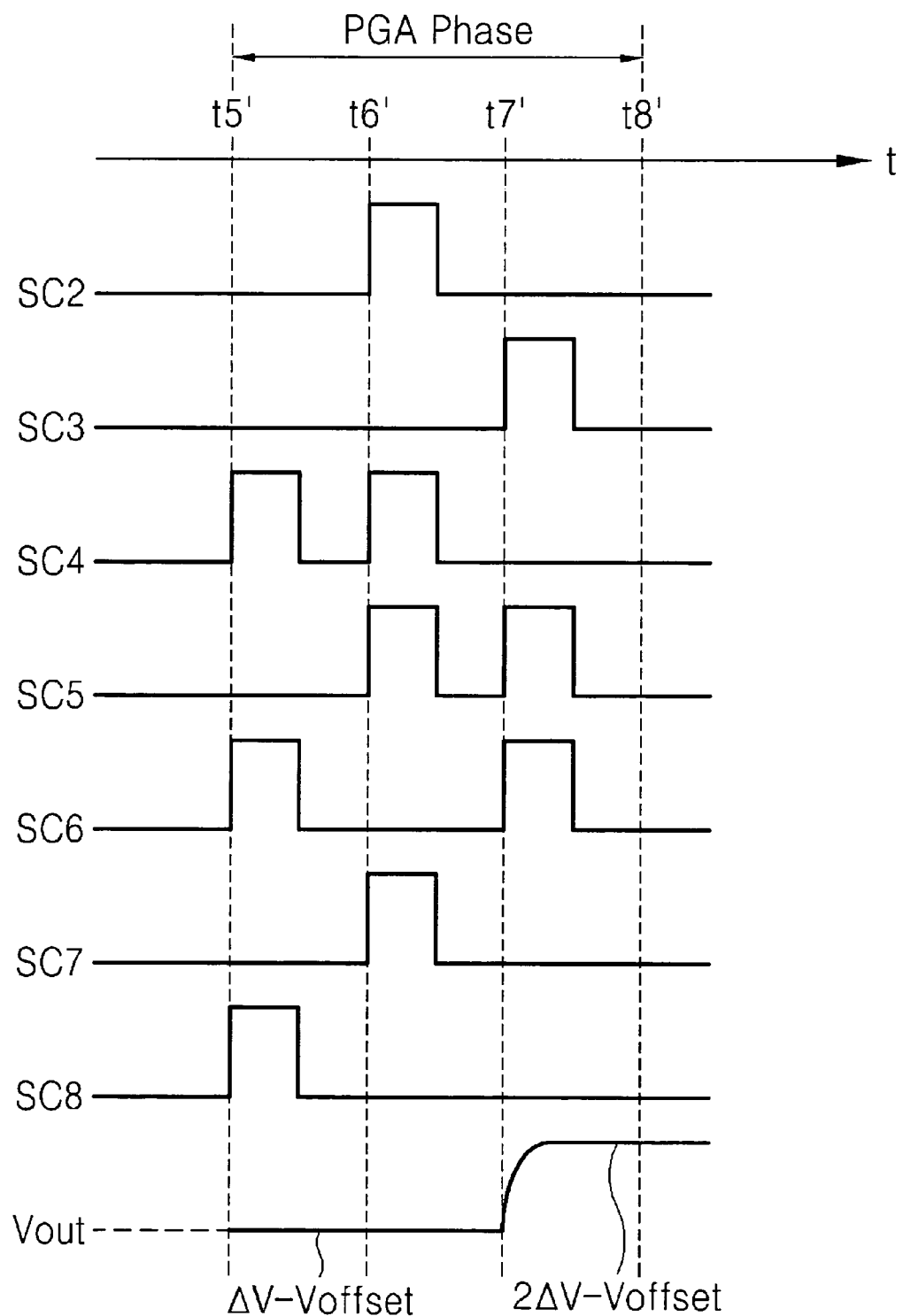
FIG. 4 is a waveform diagram for explaining an operation of the correlated double sampling circuit illustrated in FIG. 2 as another example embodiment of FIG. 3.

FIG. 3 is a waveform diagram for explaining an operation of the correlated double sampling circuit illustrated in FIG. 2, and FIG. 4 is a waveform diagram for explaining an operation of the correlated double sampling circuit illustrated in FIG. 2 as another example embodiment of FIG. 3. For convenience of explanation, embodiments of the present invention explains an operation of a correlated double sampling circuit illustrated in FIG. 2, however, an operation of a correlated double sampling circuit illustrated in FIG. 1 may also be similar.

Referring to FIGS. 2 and 3, time t0 to t2 on a time axis t is a first time interval, e.g., a reset phase interval, of the CDS circuit 101 and time t2 to t5 on the time axis t is a second time interval, e.g., a signal phase interval, of the CDS circuit 101. During time t0 to t1 on the time axis t, the switch controller 131 may output each switching signal SC1, SC2, SC4, SC5 and SC7 having a first level, e.g., a high level, in response to at least one control signal CNT. Accordingly, each switch S1, S2, S4, S5 and S7 of the CDS circuit 101 may be turned on.

When the first switch S1 is turned on, a rest signal Vrst output from a pixel array may be charged in the first capacitor C1 of the CDS circuit 101. When the second switch S2 is turned on, the second capacitor C2 may be discharged. When the fourth switch S4, a fifth switch S5 and a seventh switch S7 are turned on respectively, an offset voltage Voffset occurred from the amplifier 110 may be charged in the third capacitor C3. The CDS circuit 101 may correct or adjust an offset voltage Voffset occurred from the amplifier 110 by using the offset voltage Voffset charged in the third capacitor C3.

During time t1 to t2 on the time axis t, the switch controller 131 may output each switching signal SC3, SC5 and SC6 having a first level. Accordingly, each switch S3, S5 and S6 of the CDS circuit 101 may be turned on. When a fifth switch S5 and a sixth switch S6 are turned on and a voltage of a third node N3 is changed according to an operation of a third switch S3, a reset signal Vrst charged in a first capacitor C1 may be charged in a second capacitor C2. Since an offset voltage Voffset is charged in the third capacitor C3, an offset voltage Voffset of the amplifier 110 may be corrected. Accordingly, the CDS circuit 101 may output a reset signal Vrst after charging a reset signal Vrst, which is charged in the second capacitor C2, in the third capacitor C3.

During time t2 to t3 on the time axis t, the switch controller 131 may output each switching signal SC3, SC4 and SC6 having a first level. Accordingly, each signal S3, S4 and S6 of the CDS circuit 101 may be turned on.

When a third switch S3 and a fourth switch S4 are turned on, both terminals of a first capacitor C1 are connected to a ground GND and a reset signal Vrst charged in the first capacitor C1 may be discharged.

During time t3 to t4 on the time axis t, the switch controller 131 may output each switching signal SC1, SC5 and SC6 having a first level. Accordingly, each switch S1, S5 and S6 of the CDS circuit 101 may be turned on.

When a first switch S1 is turned on, an image signal Vsig output from a pixel array may be charged in the first capacitor C1 of the CDS circuit 101. The image signal Vsig may be a signal having predetermined voltage difference (ΔV) from the reset signal Vrst. Here, the reset signal Vrst is charged in the second capacitor C2 and the offset voltage Voffset is charged in the third capacitor C3.

When a fifth switch S5 and a sixth switch C6 are turned on, the image signal Vsig charged in the first capacitor C1 is output to the second capacitor C2, and the second capacitor C2 may be charged as much as difference (ΔV) between the reset signal Vrst, which is charged in advance, and the image signal Vsig. Accordingly, the CDS circuit 101 may output difference (ΔV) between the reset signal Vrst and the pixel signal Vsig, which are charged in the second capacitor C2, as a correlated double sampled signal during time t4 to t5 on the time axis t.

That is, since the CDS circuit 101 of the present invention includes a charging element, e.g., a third capacitor C3, which may charge an offset voltage Voffset occurred from the amplifier 110, the offset voltage Voffset charged from a final output signal output from the CDS circuit 101 may be corrected or adjusted. Therefore, the offset voltage Voffset occurred from the CDS circuit 101 may be cancelled or removed automatically.

On the other hand, as described above, when a capacitance ratio of the first capacitor C1 to the second capacitor C2 is adjusted to M:1, the CDS circuit 101 may output difference (M*ΔV) between a reset signal Vrst and a pixel signal Vsig, which are amplified by M times.

Each capacitor C1, C2 and C3 illustrated in FIGS. 1 and 2 may be switched capacitor according to embodiments described above and the CDS circuit 101 of present invention may be a switched capacitor integrator accordingly. The image sensor (not shown) needs a method amplifying an output signal output from the CDS circuit 101 for high international standards organization (ISO) sensitivity. Accordingly, the CDS circuit 101 of the present invention may perform an operation of a third time interval, e.g., a Programmable gain amplifier (PGA) phase interval, which amplifies an output signal (ΔV) during time t5 to t8 on a time axis t.

The CDS circuit 101 may use a method accumulating and amplifying an output signal(ΔV) fed back during a third time and a method adjusting a capacitance ratio of a first capacitor C1 to a second capacitor C2 and amplifying a fed back output signal (ΔV). FIG. 3 explains a method accumulating and amplifying a fed back output signal (ΔV−Voffset) as an example embodiment.

During time t5 to t6 on the time axis t, the switch controller 131 may output each switching signal SC4, SC6 and SC8 having a first level in response to at least one control signal CNT. Accordingly, each switch S4, S6 and S8 of the CDS circuit 101 may be turned on.

When an eighth switch S8 is turned on, an output signal of the CDS circuit 101, e.g., difference (ΔV) between a reset signal Vrst and an image signal Vsig, may be fed back to a third node N3. Accordingly, a fed-back output signal (ΔV) may be charged in the first capacitor C1. Here, the difference (ΔV) between the reset signal Vrst and the image signal Vsig is charged in a second capacitor C2 and an offset voltage Voffset is charged in a third capacitor C3.

During time t6 to t7 on the time axis t, the switch controller 131 may output each switching signal SC4, SC5 and SC7 having a first level. Accordingly, each switch S4, S5 ad S7 of the CDS circuit 101 may be turned on.

During time t7 to t8 of the time axis t, the switch controller 131 may output each switching signal SC3, SC5 and SC6 having a first level. Accordingly, each switch S3, S5 and S6 of the CDS circuit 101 may be turned on. The CDS circuit 101 may output an output signal (2ΔV) amplified by twice according to the difference (ΔV) between the reset signal Vrst and the image signal Vsig, charged in the first capacitor C1 and the second capacitor C2, respectively. Here, the output signal (2ΔV) amplified by twice output from the CDS circuit 101 may be a signal in which an offset voltage is corrected by the offset voltage Voffset charged in the third capacitor C3. Additionally, once an operation of the third time interval, i.e., time t5 to t8 on the time axis t, of the present invention is performed N times repetitively, an output signal output from the CDS circuit 101 at last may be a signal amplified by $2^N$ times from an initial output signal (ΔV).

The following explains an amplification method of an output signal according to another example embodiment referring to FIG. 4. The first capacitor C1 may be embodied as a variable capacitor. The capacitance of the first capacitor C1 different from the capacitance of the second capacitor C2.

Referring to FIGS. 2 and 4, the switch controller 131 during time t5' to t6' on the time axis t may output each switching signal SC4, SC6 and SC8 having a first level. Accordingly, each switch S4, S6 and S8 of the CDS circuit 101 may be turned on.

When an eighth switch S8 is turned on, an output signal (ΔV−Voffset) of the CDS circuit 101 may be fed back to a third node N3. Accordingly, a fed back output signal (ΔV) may be charged in the first capacitor C1. Here, difference (ΔV) between a reset signal Vrst and an image signal Vsig is charged in a second capacitor C2 and an offset voltage Voffset is charged in a third capacitor C3.

During time t6' to t7' on the time axis t, the switch controller 131 may output each switching signal SC2, SC4, SC5 and SC7, having a first level. Accordingly, each switch S2, S4, S5 and S7 of the CDS circuit 101 may be turned on. When a second switch S2 is turned on, the second capacitor C2 may be discharged.

During time t7' to t8' on the time axis t, the switch controller 131 may output each switching signal SC3, SC5 and SC6, having a first level. Accordingly, each switch S3, S5 and S6 of the CDS circuit 101 may be turned on. When a fifth switch S5 and a sixth switch S6 are turned on, an output signal (ΔV−Voffset) charged in the first capacitor C1 may be transmitted to the second capacitor C2. Here, since the first capacitor C1 is changed to have M times capacitance compared to the second capacitor C2, M times of the output signal (ΔV) charged in the first capacitor C1 may be charged in the second capacitor C2. For example, when capacitance of the first capacitor C1 is changed to be twice as much as one of the second capacitor C2, twice of output signal (2ΔV) may be charged in the second capacitor C2 by a fifth switch S5 and a sixth switch S6, which are turned on.

Accordingly, the CDS circuit 101 may output a M times amplified output signal (M*ΔV) charged in the second capacitor C2 during time t7' to t8' on the time axis t. Here, the M times amplified output signal (M*ΔV) output from the CDS circuit 101 may have an offset voltage corrected by an offset voltage Voffset charged in the third capacitor C3. On the other hand, when a capacitance ratio of the first capacitor C1 to the second capacitor C2 is adjusted to M:1 during a CDS phase operation of the CDS circuit 101, the CDS circuit 101 may output difference (M*ΔV) between a reset signal Vrst and an image signal Vsig, which are amplified by M times. Accordingly, an output signal output from the CDS circuit 101 during a PGA phase operation may be a signal (M*M*ΔV) amplified by M times again of an M times-amplified output signal (M*ΔV).

In addition, a capacitance ratio of the first capacitor C1 to the second capacitor C2 are adjusted to M:1 during a CDS phase operation of the CDS circuit 101 and the capacitance ratio of the first capacitor C1 to the second capacitor C2 is re-adjusted to M':1 during a PGA phase operation according to embodiments, an output signal output from the CDS circuit 101 during the PGA phase operation may be a signal (M'*M*ΔV) amplified by M' times again of an M times-amplified output signal (M*ΔV).

Figure 5:
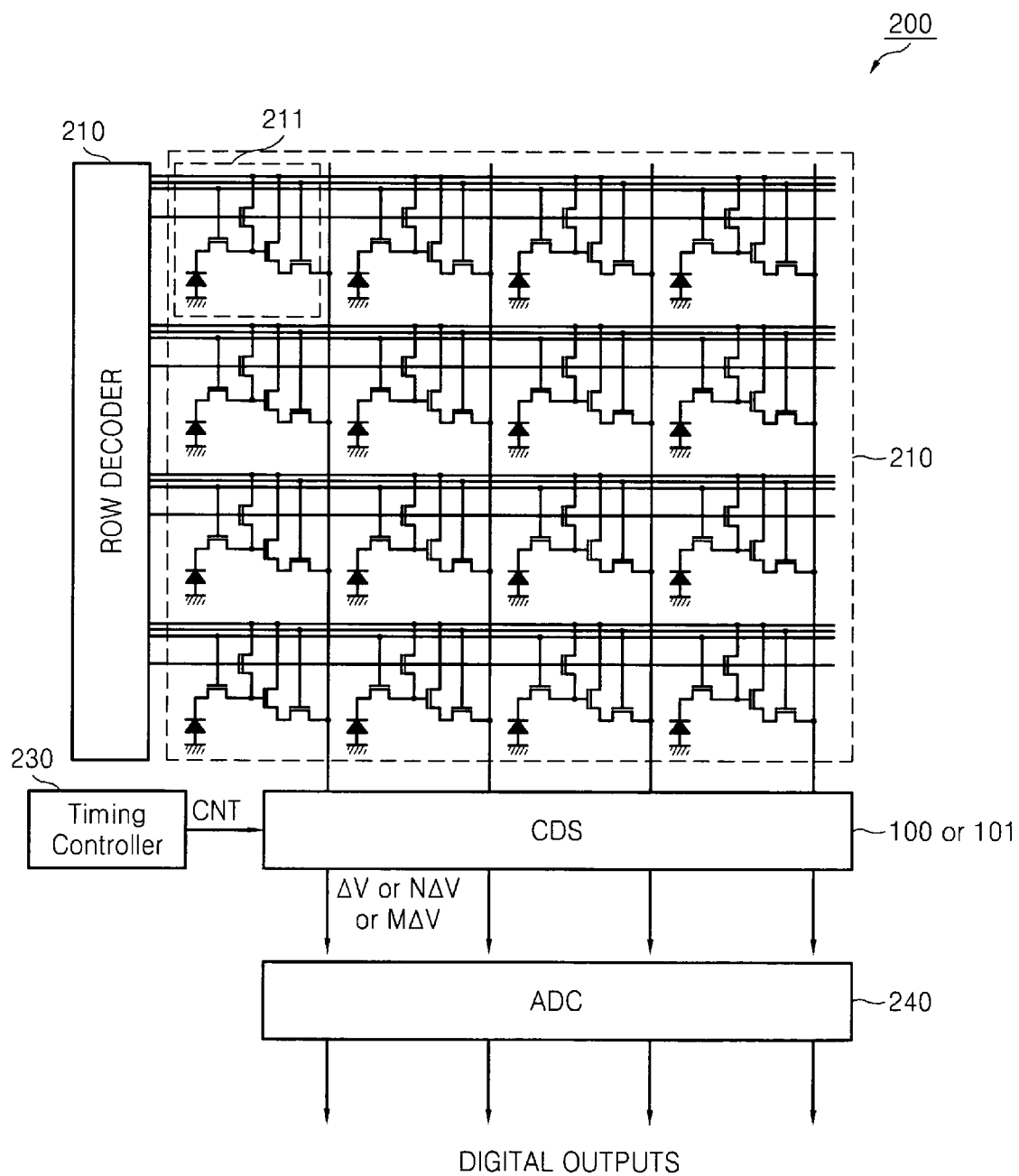
FIG. 5 is a schematic block diagram of an image sensor according to an example embodiment of the present invention.

FIG. 5 is a schematic block diagram of an image sensor according to an example embodiment of the present invention.

Referring to FIG. 5, an image sensor 200, which is used as an example of an image pick up device or image capture device, may include a pixel array 210 including a plurality of pixels 211, a row decoder 220 outputting a control signal for controlling each of the plurality of pixels 211, a correlated double sampling circuit 100 or 101 for correlated double sampling a signal output from the pixel array 210, a timing controller 230 outputting a control signal CNT for controlling an operation of the correlated double sampling circuit 100 or 101, and an analog to digital converter 240 for performing analog to digital conversion on a correlated double sampled analog output signal(ΔV or N*ΔV or M*ΔV) output from the correlated double sampling circuit 100 or 101. The image sensor 200 according to embodiments of the present invention may be a CMOS image sensor using a CMOS process.

The correlated double sampling circuit 101 may be connected to each column line of the pixel array 210 and may be a correlated double sampling circuit 100 or 101 illustrated in FIGS. 1 and 2. When the correlated double sampling circuit 100 illustrated in FIG. 1 is used, an amplification unit, e.g., a PGA (not shown) for amplifying an output signal (ΔV) output from the correlated double sampling circuit 100, may be further included between the correlated double sampling circuit 100 and the analog to digital converter 240.

The plurality of pixels 211 of the pixel array 210 may include a photoelectric conversion element, e.g., a photo diode, a photo transistor or a pinned photo diode, respectively. Each of the pixels 211 may convert an optical signal to an electrical signal. The analog to digital converter 240 may be a delta-sigma analog to digital converter. The delta-sigma analog to digital converter may include a delta-sigma modulator (not shown) and a digital filter (not shown).

Figure 6:
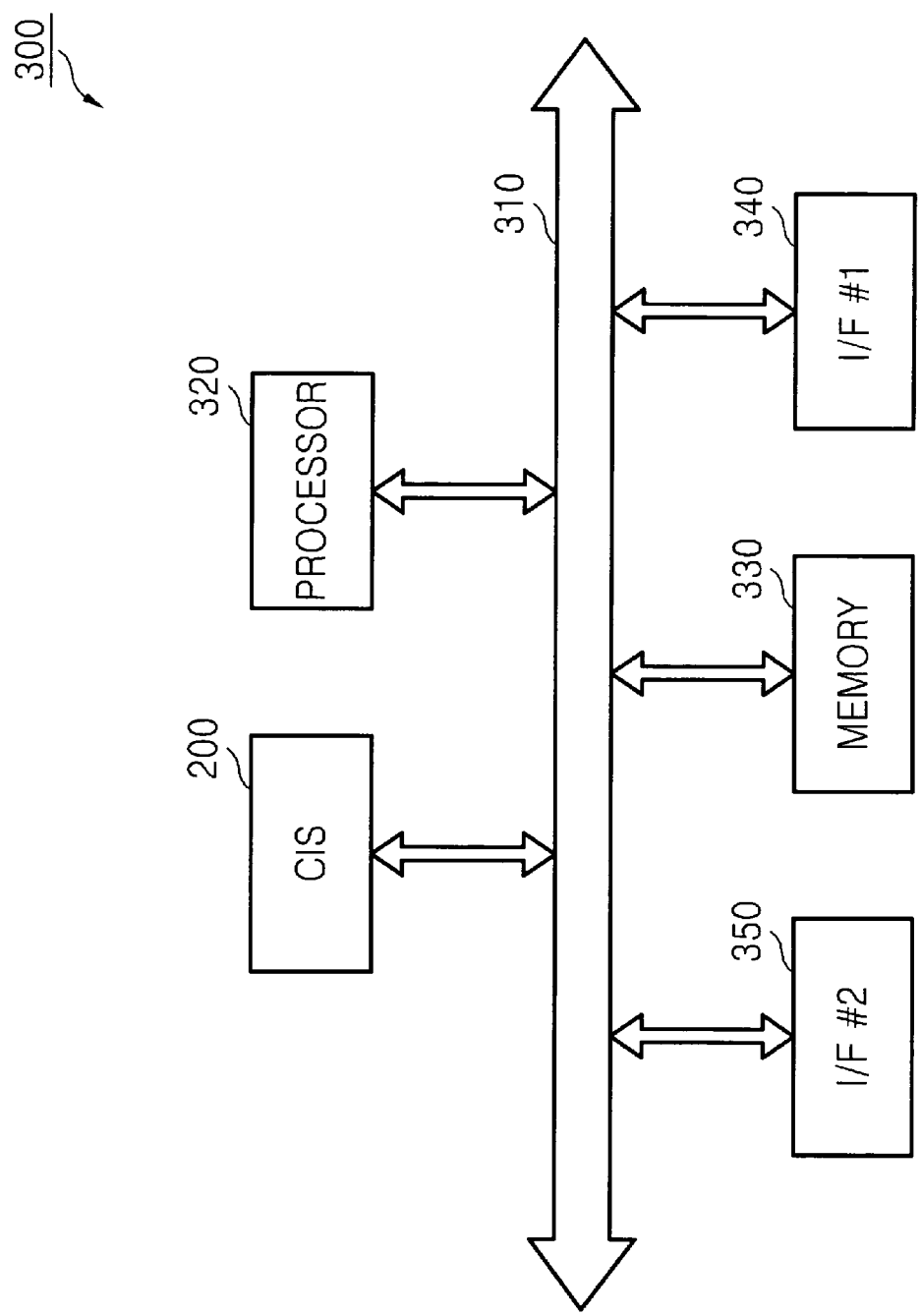
FIG. 6 is a schematic block diagram of an image processing system including an image sensor according to an example embodiment of the present invention.

FIG. 6 is a schematic block diagram of an image processing system including an image sensor according to embodiments of the present invention. The image processing system 300 may be an image processing device such as a digital camera, a portable communication device having the digital camera, e.g., a mobile phone, a smart phone, a personal digital assistant (PDA), a portable multimedia player (PMP), Information Technology (IT) device or a satellite communication device and so on. The image processing system 300 may include the image sensor as illustrated in FIG. 5 and the processor 320 for processing an image signal or image data output from the image sensor 200.

The image processing system 300 may further include a memory device 330 for storing signals or data processed by the processor 320. The memory device 330 may be embodied as a non-volatile memory, e.g., an EEPROM, a flash memory, a PRAM, a MRAM, or a ReRAM. The memory device 330 may be also embodied a volatile memory, e.g., a DRAM or a SRAM.

The image processing system 300 may further include an input/output interface 340 for outputting a signal processed by the processor 320 to outside or transmitting a signal input from outside to the processor 320. The image processing system 300 may further include a wireless interface 350 for outputting a signal processed by the processor 320 to outside by radio or transmitting a signal input from outside by radio to the processor 320.

The image processing system 300 may further include a battery (not shown) for supplying an operational power to each component 200, 320, 330, 340 and 350. Each component 200, 320, 330, 340 and 350 of the image processing system 300 may be connected to each other through a bus 310.

The correlated double sampling circuit according to embodiments of the present invention and apparatuses including the same may perform a CDS operation and a PGA operation without any increase of a total area of CIS by performing a PGA operation amplifying a correlated double sampled result or a signal by using a capacitor of the correlated double sampling circuit. Moreover, by adding an offset correction circuit to the correlated double sampling circuit, the correlated double sampling circuit of the present invention and apparatuses including the same may cancel an offset voltage occurred at the correlated double sampling circuit from a CDS operation automatically.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A correlated double sampling (CDS) circuit comprising:
    a sampling circuit configured to perform a CDS on a reset signal and an image signal respectively during a CDS phase and configured to output a difference between a correlated double sampled reset signal and a correlated double sampled image signal;
    a feedback unit configured to feed back the difference output from the sampling circuit to an input of the sampling circuit during a programmable gain amplifier (PGA) phase; and
    an offset correction circuit configured to correct an offset voltage in the difference between the correlated double sampled reset signal and the correlated double sampled image signal, and cancel an offset voltage of the CDS circuit during the CDS phase using the corrected offset voltage, wherein
    the sampling circuit is configured to amplify the difference fed back during the PGA phase by N times (N is a natural number) and output a first amplified signal, and the sampling circuit includes,
        an amplifier including a first input terminal and a second input terminal, and configured to output the difference between the correlated double sampled reset signal and the correlated double sampled image signal as an output signal,
        a first capacitor connected to the first input terminal of the amplifier through a first node, and
        a second capacitor connected between an output terminal of the amplifier and a second node,
    the feedback unit is connected between the output terminal of the amplifier and the first node and is configured to feedback the output signal to the first node,
    at least one of the first capacitor and the second capacitor are configured to vary the capacitance ratio there between to M (M is a natural number):1 during the CDS phase, and to vary the capacitance ratio of the first capacitor to the second capacitor to M' (M' is a natural number):1 during the PGA phase, and
    the amplifier is configured to amplify the fed-back output signal by (M*M') times and output a second amplified signal.

2. The CDS circuit of claim 1, wherein
    the feedback unit is configured to feedback the output signal to the first node N times during the PGA phase, and
    the amplifier is configured to amplify the output signal which is fed back N times by $2^N$ times and output the result as the first amplified signal.

3. The CDS circuit of claim 1, wherein one of the first capacitor and the second capacitor is a variable capacitor.

4. The CDS circuit of claim 1, wherein the sampling circuit is configured to generate the offset voltage,
    wherein the offset correction circuit includes,
    a first switch connected between the first node and the second input terminal of the amplifier;

a second switch connected between the first node and the second node;
a third switch connected between the first input terminal of the amplifier and an output terminal of the amplifier; and
a third capacitor connected between the first input terminal of the amplifier and the first node,
wherein the offset correction circuit is configured to charge the offset voltage in the third capacitor during a first time period of the CDS phase and to correct an offset voltage charged in the third capacitor from the output signal during a second time period of the CDS phase.

5. An image sensor comprising:
a pixel array including a plurality of pixels each configured to convert an optical signal to an electrical signal;
a correlated double sampling (CDS) circuit configured to perform a CDS on a reset signal and an image signal respectively, which are output from the pixel array, and to output a correlated double sampled analog signal;
an analog to digital converter configured to perform analog to digital conversion on the correlated double sampled analog signal output from the CDS circuit, wherein the CDS circuit includes,
  a sampling circuit configured to perform the CDS on each of the reset signal and the image signal during a CDS phase and configured to output a difference between a correlated double sampled reset signal and a correlated double sampled image signal;
  a feedback unit for configured to feed back the difference output from the sampling circuit to an input of the sampling circuit during a programmable gain amplifier (PGA) phase; and
  an offset correction circuit configured to correct an offset voltage in the difference between the correlated double sampled reset signal and the correlated double sampled image signal, and cancel an offset voltage of the CDS circuit during the CDS phase using the corrected offset voltage, wherein
  the sampling circuit is configured to amplify the difference fed back during the PGA phase by N times (N is a natural number) and to output a first amplified signal,
  the sampling circuit includes,
    an amplifier including a first input terminal and a second input terminal, and configured to output the difference between the correlated double sampled reset signal and the correlated double sampled image signal as an output signal,
    a first capacitor connected to the first input terminal of the amplifier through a first node, and
    a second capacitor connected between an output terminal of the amplifier and a second node,
  the feedback unit is connected between the output terminal of the amplifier and the first node and is configured to feedback the output signal to the first node,
  at least one of the first capacitor and the second capacitor are configured to vary the capacitance ratio there between to M (M is a natural number):1 during the CDS phase, and to vary the capacitance ratio of the first capacitor to the second capacitor to M' (M' is a natural number):1 during the PGA phase, and
the amplifier is configured to amplify the fed-back output signal by (M*M') times and output a second amplified signal.

6. The image sensor of claim 5, wherein the analog to digital converter is a delta-sigma analog digital converter.

7. The image sensor of claim 5, wherein
the feedback unit is configured to feedback the output signal to the first node N times during the PGA phase and the amplifier is configured to amplify the output signal which is fed back N times by $2^N$ times and output the result as the first amplified signal.

8. The image sensor of claim 5, wherein the sampling circuit is configured to generate the offset voltage,
wherein the offset correction circuit includes,
  a first switch connected between the first node and the second input terminal of the amplifier;
  a second switch connected between the first node and the second node;
  a third switch connected between the first input terminal of the amplifier and an output terminal of the amplifier; and
  a third capacitor connected between the first input terminal of the amplifier and the first node, wherein the offset correction circuit is configured to charge the offset voltage in the third capacitor during a first time period of the CDS phase and corrects an offset voltage charged in the third capacitor from the output signal during a second time period of the CDS phase.

9. An image processing system comprising:
an image sensor; and
a processor configured to process a signal output from the image sensor, wherein the image sensor includes,
a pixel array including a plurality of pixels configured to each converting an optical signal to an electric signal;
a correlated double sampling (CDS) circuit configured to perform a CDS on a reset signal and an image signal output from the pixel array, respectively, and to output a correlated double sampled analog signal;
an analog to digital converter configured to perform analog to digital conversion on the correlated double sampled analog signal output from the CDS circuit, wherein the CDS circuit includes,
  a sampling circuit configured to perform the CDS on each of the reset signal and the image signal during a CDS phase and to output a difference between a correlated double sampled reset signal and a correlated double sampled image signal;
  a feedback unit configured to feed back the difference-output from the sampling circuit during a programmable gain amplifier (PGA) phase to an input of the sampling circuit; and
  an offset correction circuit configured to correct an offset voltage in the difference between the correlated double sampled reset signal and the correlated double sampled image signal, and cancel an offset voltage of the CDS circuit during the CDS phase using the corrected offset voltage, wherein the sampling circuit is configured to amplify the difference fed back during the PGA phase by N times (N is a natural number) and to output a first amplified signal, wherein
  the sampling circuit includes,
    an amplifier including a first input terminal and a second input terminal, and configured to output the difference between the correlated double sampled reset signal and the correlated double sampled image signal as an output signal,
    a first capacitor connected to the first input terminal of the amplifier through a first node, and
    a second capacitor connected between an output terminal of the amplifier and a second node, the feedback unit is connected between the output terminal of the amplifier and the first node and is configured to feedback the output signal to the first node, at least one of the first capacitor and the second capacitor are configured to vary the capacitance ratio there between to M (M is a natural number):1 during the CDS phase, and to vary the capacitance ratio of the first capacitor to the second capacitor to M' (M' is a natural number):1 during the PGA phase, and the amplifier is configured to amplify the fed-back output signal by (M*M') times and output a second amplified signal.

10. The image processing system of claim 9, wherein the sampling circuit is configured to generate the offset voltage, wherein the offset correction circuit includes, a first switch connected between the first node and the second input terminal of the amplifier;

a second switch connected between the first node and the second node;

a third switch connected between the first input terminal of the amplifier and an output terminal of the amplifier; and a third capacitor connected between the first input terminal of the amplifier and the first node, wherein the offset correction circuit is configured to charge the offset voltage in the third capacitor during a first time of the CDS phase and to correct an offset voltage charged in the third capacitor from the output signal during a second time of the CDS phase.

* * * * *